US006198730B1

(12) United States Patent
Hogberg et al.

(10) Patent No.: US 6,198,730 B1
(45) Date of Patent: Mar. 6, 2001

(54) SYSTEMS AND METHOD FOR USE IN A DUAL MODE SATELLITE COMMUNICATIONS SYSTEM

(75) Inventors: Shawn Wesley Hogberg, Chandler; Thomas Peter Emmons, Jr., Mesa; Robert H. Smith, Tempe, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/170,257

(22) Filed: Oct. 13, 1998

(51) Int. Cl.[7] .............................. H04B 7/212; H04B 7/216
(52) U.S. Cl. ................... 370/320; 370/321; 370/335; 370/336; 370/466
(58) Field of Search ........................... 370/316, 319, 370/320, 321, 323, 326, 329, 335, 336, 337, 342, 465, 466, 467, 341, 345, 347, 441, 442

(56) References Cited

U.S. PATENT DOCUMENTS

| 5,249,302 | * | 9/1993 | Metroka et al. | 455/521 |
| 5,345,439 | * | 9/1994 | Marston | 370/320 |
| 5,412,375 | * | 5/1995 | Wood | 345/825.03 |
| 5,649,308 | | 7/1997 | Andrews | 370/334 |
| 5,655,003 | | 8/1997 | Erving et al. | 379/418 |
| 5,732,076 | | 3/1998 | Ketseoglou et al. | 370/347 |
| 5,737,686 | * | 4/1998 | Fukui | 370/316 |
| 5,781,540 | * | 7/1998 | Malcolm et al. | 370/321 |

FOREIGN PATENT DOCUMENTS

| 0665659 | 8/1995 | (EP) | H04B/7/26 |
| 2297460 | 7/1996 | (GB) | H04Q/7/38 |
| 9221195 | 11/1992 | (WO) | H04L/27/30 |
| 9730526 | 8/1997 | (WO) | H04B/7/26 |
| 9844656 | 10/1998 | (WO) | H04B/7/02 |

* cited by examiner

*Primary Examiner*—Chau Nguyen
*Assistant Examiner*—Soon-Dong Hyun
(74) *Attorney, Agent, or Firm*—Harold C. McGurk; Gregory J. Gorrie; Frank J. Bogacz

(57) ABSTRACT

A communications network is capable of using time division multiple access (TDMA) techniques, code division multiple access (CDMA) techniques, or a combination of both. A subscriber unit (30) makes a request for a traffic channel over a CDMA pilot channel or a TDMA broadcast channel. A satellite (20) or a base station (40) receives the request and determines whether to assign a TDMA or CDMA traffic channel. The downlink and uplink can have the same access scheme (e.g., TDMA) or different access schemes (e.g., TDMA on the uplink and CDMA on the downlink).

2 Claims, 4 Drawing Sheets

SYSTEMS AND METHOD FOR USE IN A DUAL MODE SATELLITE COMMUNICATIONS SYSTEM

TECHNICAL FIELD

The invention relates to satellite communication systems, and in particular, to a satellite and subscriber unit that have the ability to use both code division multiple access and time division multiple access.

BACKGROUND OF THE INVENTION

Time division multiple access (TDMA) techniques provide a large number of communication channels for telephony services and are optimal for peaky environments. The load in each satellite beam can be peaky due to high densities of subscribers in metropolitan areas. TDMA access schemes allow frequency assignments to be reallocated from low utilization beams to hot spots. TDMA systems are therefore optimal for coverage in the western United States where cities tend to be more widely separated than cities on the eastern United States.

Code division multiple access (CDMA) techniques are used to provide services requiring more uniform, non-peaky loaded services to take advantage of the CDMA reuse factor and variable data rate services. CDMA is optimal for uniform density environments and is optimal for coverage in the eastern United States and Europe where metropolitan areas overlap.

There is a significant need for a multi-mode system and subscriber unit that are able to use both TDMA and CDMA techniques based on the current usage or the load on the system.

DETAILED DESCRIPTION OF THE DRAWINGS

This invention involves the use of multiple access techniques within a communications network. In a preferred embodiment, the communications network uses time division multiple access (TDMA) and code division multiple access (CDMA). By using multiple access techniques, quality of service is improved and two different types of high capacity areas can be serviced, uniform and peaky. A preferred embodiment of the invention uses multi-mode subscriber equipment and a multi-mode satellite communications system to seamlessly use TDMA and CDMA access methods.

A "satellite" as used throughout this description means a man-made object or vehicle which orbits the earth at non-geostationary altitudes (e.g., low-earth or medium-earth altitudes) or geostationary altitudes. A "constellation" means a number of satellites arranged in orbits for providing specified coverage (e.g., radio communication, remote sensing, etc.) of a portion, portions or all of the earth. A constellation typically includes multiple rings (or planes) of satellites and can have an equal number of satellites in each plane, although this is not essential.

Figure 1:
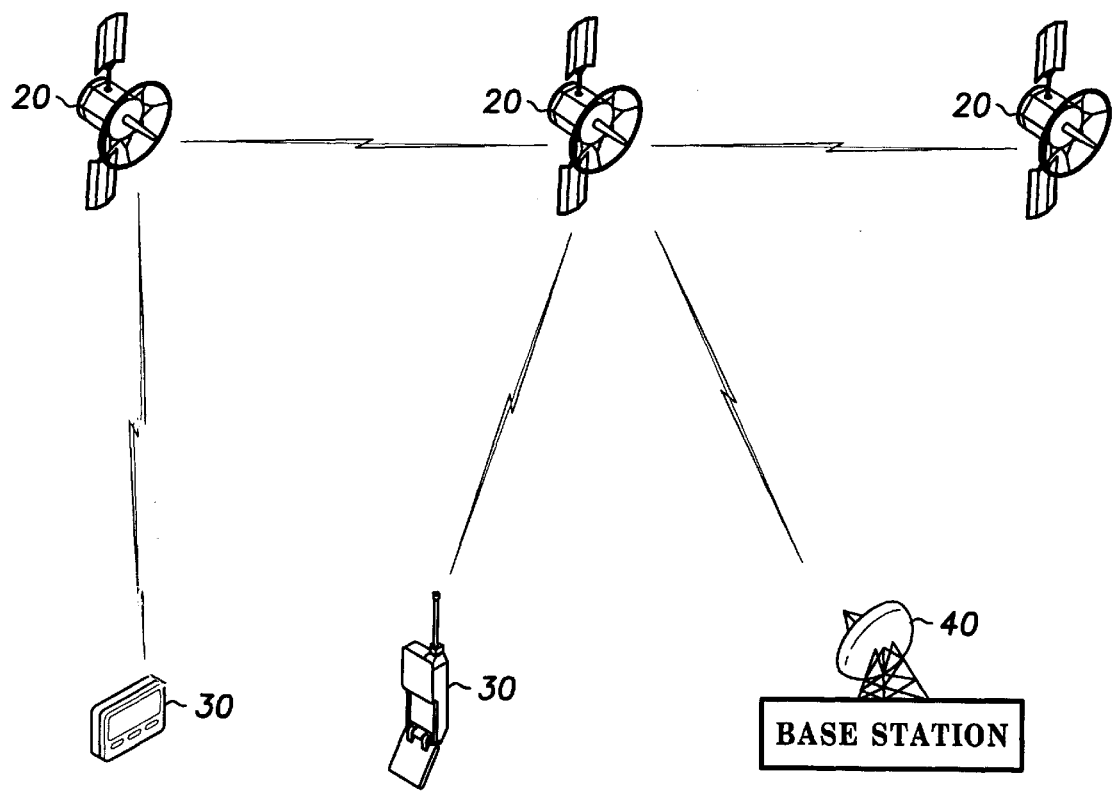
FIG. 1 shows a satellite communication system according to a preferred embodiment of the present invention.

FIG. 1 shows a satellite communication system according to a preferred embodiment of the invention. Although FIG. 1 illustrates a highly simplified diagram of communication system 10, system 10 comprises a number of satellites 20, any number of subscriber units 30 and any number of base stations 40. Although the present invention is applicable to space-based communication systems 10 having at least one satellite 20 in low-earth or medium-earth orbit, satellite 20 is preferably part of a number of satellites in low-earth orbit around earth. However in alternative embodiments, satellite 20 can be a medium-earth orbit satellite or geosynchronous satellite. Satellite 20 can be in the same satellite network, or can be in different satellite networks, including for example, the Iridium® system or the Globalstar network.

Satellite 20 can be one of many satellites in at least one constellation of satellites orbiting the earth. The present invention is also applicable to space-based communication systems 10 having satellites 20 which orbit the earth at any angle of inclination including polar, equatorial, inclined or other orbital patterns. The present invention is applicable to systems 10 where full coverage of the earth is not achieved (i.e., where there are "holes" in the communication coverage provided by the constellation) and to systems 10 where plural coverage of portions of the earth occur (i.e., more than one satellite is in view of a particular point on the earth's surface).

Each satellite 20 communicates with other adjacent satellites 20 through cross links in a preferred embodiment of the present invention. These cross links form a backbone of space-based satellite communication system 10. Thus, a call or communication from one subscriber unit located at any point on or near the surface of the earth can be routed through a satellite or a constellation of satellites to within range of substantially any other point on the surface of the earth. A communication can be routed down to a subscriber unit (which is receiving the call) on or near the surface of the earth from another satellite 20. In alternative embodiments, if there are no cross links, one satellite 20 can communicate with another satellite 20 via routing the call through base station 40.

Subscriber units 30 of FIG. 1 can be located anywhere on the surface of earth or in the atmosphere above earth. Communication system 10 can accommodate any number of subscriber units 30. Subscriber units 30 are preferably communication devices capable of transmitting and receiving data. The data can of any type, including alphanumeric or numeric for example. By way of example, subscriber units 30 can be a satellite telephone or satellite pager. Moreover, subscriber units 30 do not have to be mobile or moving, but can be fixed in one location for an extended period of time.

Base station 40 communicates with and controls satellites 20. In the Iridium system, base station 40 can be a gateway or a satellite control facility. In a preferred embodiment, there can be multiple base stations 40 located at different regions on the earth. For example, there can be one base station 40 located in Honolulu, another located in Los Angeles and another in Washington, D.C. Another example is to have separate base stations located in each country on the earth. Base stations 40 can provide satellite control commands to satellites 20 so that satellites 20 maintain their proper orbital position and perform other essential housekeeping tasks. Base stations 40 can be additionally responsible for receiving calling packet data, paging data or other types of information from satellite 20.

Base stations 40 provide certain basic services within satellite communication system 10. They provide control of access to the system for subscribers for whom a base station is "home", e.g., where information is stored about the subscribers, including information to authenticate the subscriber's identity and what services are available to the subscriber. The base stations 40 also provide system subscribers with access to Public Switched Telephone Network (PSTN), and it provides PSTN customers with access to system subscribers through the satellite network.

Figure 2:
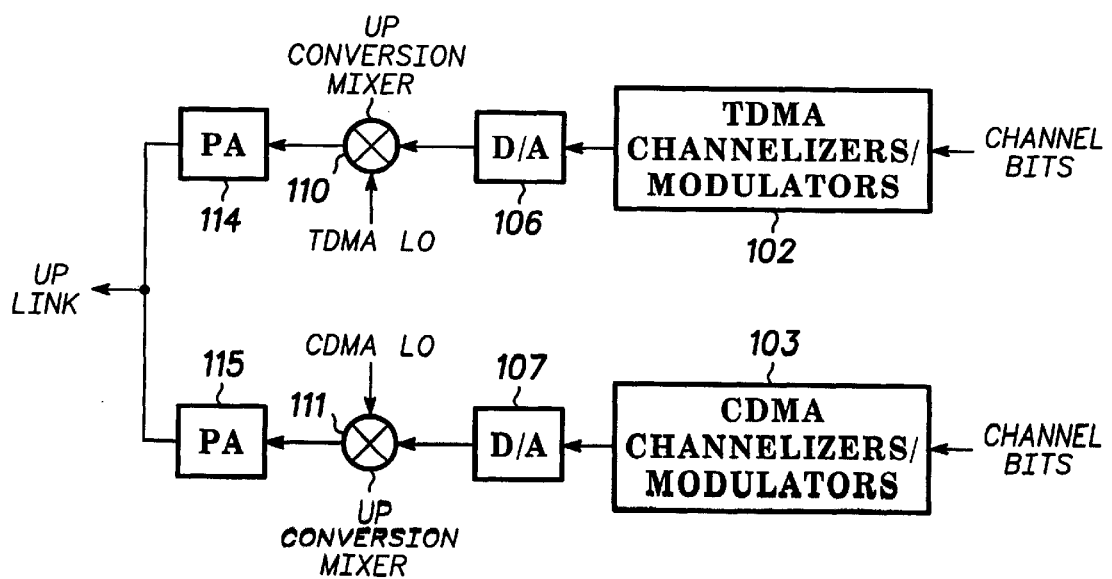
FIG. 2 shows a block diagram of a transmitter system of a satellite according to a preferred embodiment of the present invention.

FIG. 2 shows a block diagram of a transmitter system of a satellite according to a preferred embodiment of the invention. Although the block diagram will be described in reference to a satellite, the block diagram is also applicable to a transmitter of a base station. The transmitter of satellite 20 comprises TDMA channelizers/modulators 102, CDMA channelizers/modulators 103, D/A (digital to analog) converters 106 and 107, up conversion mixers 110 and 111, and power amplifiers 114 and 115. These parts are well known to those skilled in the art and are commercially available.

There are separate paths through the satellite transmitter, one path for a TDMA signal and another path for a CDMA signal. TDMA subscriber channel bits are provided to TDMA channelizers/modulators 102, while CDMA subscriber channel bits are provided to CDMA channelizers/modulators 103. The channel bits originate from packets received from the cross links (from other satellites), feederlinks (from ground stations), or other subscriber links. Therefore, these bits are generated from packets that are routed to the subscribers' downlink modem.

A channel bit is the fundamental unit of information that is being transmitted or received. For example, when a user speaks into a subscriber unit (e.g., satellite telephone), the voice of the user is sampled and bits of information are generated. The channel bits are then coded, modulated, channelized and ultimately converted into an RF (radio frequency) signal for transmission over a wireless link and eventually through a satellite or a base station to another subscriber unit. A vocoder in subscriber unit 30 provides an interface between the user and the channel bits in the case of telephony applications. In the case of data, the uncoded channel bits are equivalent to the data bits.

After the channel bits are received by channelizers/modulators 102 or 103, they are coded (e.g., error detection and correction), modulated (e.g., TDMA or CDMA), and channelized (e.g., frequency selection, filtering function) digitally until they reach one of the D/A converters 106 or 107. Modulators are used for modulating the channel bits using QPSK (quadrature phase shift keying) or some other access scheme well known to those skilled in the art.

Channelizers 102, 103 are used to provide specific frequency/time slot channels (TDMA/FDMA) or frequency/code (CDMA/FDMA) channels. For example, TDMA channelizers 102 are capable of "channelizing" a 10 MHz bandwidth of spectrum into 240 separate frequency channels each approximately 41 KHz wide using four time slots. CDMA channelizers 103 can provide as many as 64 codes (Walsh codes) using perhaps three or four distinct frequency bands. Another possibility for CDMA is TD/CDMA channelizers that can provide four time slots with 64 codes in a single frequency band. A TD/CDMA/TDMA channelizer could provide four time slots with 64 codes with three or four distinct frequency bands. Although the numbers mentioned above are preferred, the number of channels or codes provided by the latest TDMA or CDMA technology may be more or less.

Up conversion mixer 110 is coupled to D/A converter 106 and power amplifiers 114. D/A converters 106 and 107 convert the digital signal received from TDMA or CDMA channelizers/modulators 102, 103, respectively, to an analog signal. Up conversion mixers 110, 111 convert an IF (intermediate frequency) signal to an RF analog signal using a TDMA local oscillator (LO) signal or a CDMA local oscillator signal, e.g., RF=LO+IF. The LO signal is generated from an oscillator (hence the term local oscillator-LO) that is separate from the RF subsystem of the transmitter. The LO is a CW (continuous wave) signal. There are many possible implementations for this LO source including VCOs (voltage controlled oscillators), synthesizers, etc. that are well known to those skilled in the art. After the RF signals are amplified by power amplifiers 114, 115, they are transmitted by an antenna (not shown in FIG. 2) to subscriber units and/or base stations.

Figure 3:
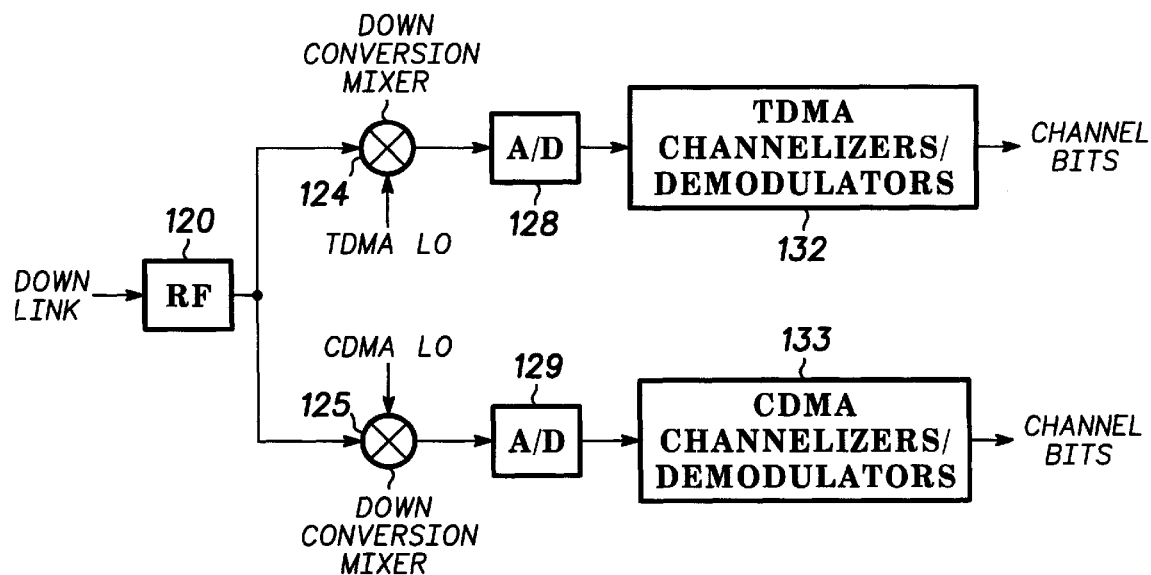
FIG. 3 shows a block diagram of a receiver system of a satellite according to a preferred embodiment of the present invention.

FIG. 3 shows a block diagram of a receiver system of a satellite according to a preferred embodiment of the invention. Although the block diagram will be described in reference to a satellite, the block diagram is also applicable to a receiver of a base station. The receiver of satellite 20 comprises RF (radio frequency) front end 120, down conversion mixers 124 and 125, A/D (analog to digital) converters 128 and 129, TDMA channelizers/demodulators 132 and CDMA channelizers/demodulators 133. These parts are well known to those skilled in the art and are commercially available.

As shown in FIG. 3, RF front end 120 is coupled to down conversion mixers 124 and 125 and is able to receive RF signals from subscriber units and base stations. RF front end 120 comprises an external receive antenna and a low noise amplifier (LNA). In an alternative embodiment and specifically for digital beamforming, RF front end 120 comprises an LNA, mixer and A/D converter in an integrated package.

RF front end 120 passes the received RF signal to both TDMA down conversion mixer 124 and CDMA down conversion mixer 125. The down conversion mixers 124, 125 take the RF signal and convert it to an IF signal using respective signals from TDMA LO signal or CDMA LO signal. The equation, IF=RF−LO, specifies how the RF signal is converted into an IF signal. The IF signal is then converted into a digital signal by A/D converters 128 or 129 and fed into TDMA channelizers/demodulators 132 or CDMA channelizers/demodulators 133. Channelizers/demodulators 132, 133 demodulate the digital IF signal, and the demodulated signal bits are converted into a data packet and routed to the appropriate destination which could be another subscriber link, cross link, or feederlink. The data packet gets routed and then the downlink process described above occurs which varies depending on what type of link is used—subscriber, cross, or feeder link).

Figure 4:
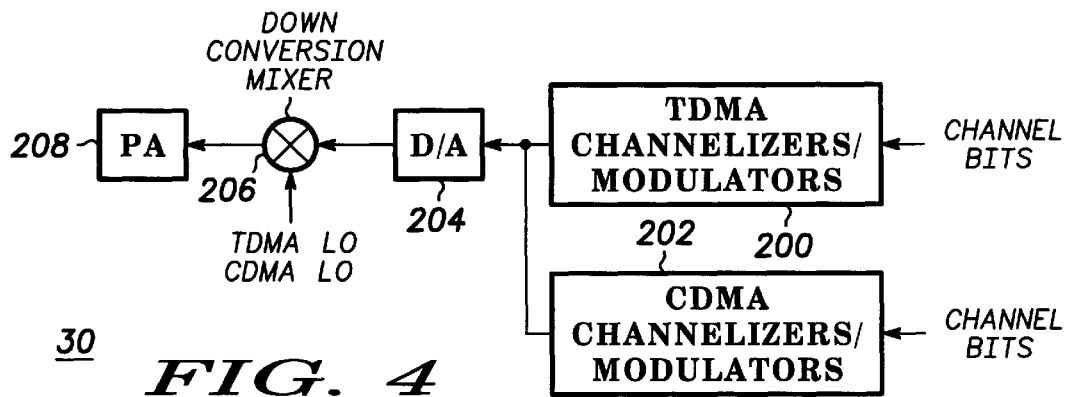
FIG. 4 shows a block diagram of a transmitter system of a subscriber unit according to a preferred embodiment of the present invention.

FIG. 4 shows a block diagram of a transmitter system of a subscriber unit according to a preferred embodiment of the invention. Transmitter system comprises TDMA channelizer/modulator 200, CDMA channelizer/modulator 202, D/A converter 204, up conversion mixer 206 and power amplifiers 208. The parts used in transmitter system of subscriber unit 30 are well known to those skilled in the art and are commercially available. The operation and functions of these parts are similar to the parts shown and described in FIG. 2.

There is a separate path through the subscriber unit's transmitter for transmission of TDMA signals and CDMA signals. TDMA subscriber channel bits are fed into TDMA channelizers/modulators 200, while CDMA subscriber channel bits are provided to CDMA channelizers/modulators 202. Channel bits are coded, modulated, channelized and ultimately converted into an RF (radio frequency) signal for transmission to a satellite. A vocoder in subscriber unit 30 provides an interface between the user and the channel bits in the case a telephony applications. In the case of data, the uncoded channel bits are equivalent to the data bits.

When the channel bits are received by channelizers/modulators 200 or 202, they are coded (e.g., error detection and correction), modulated (e.g., TDMA or CDMA), and channelized (e.g., frequency selection, filtering function) digitally until the output reaches D/A converter 204. Modulators are used for modulating the channel bits using QPSK (quadrature phase shift keying) or some other access scheme well known to those skilled in the art.

Channelizers 200, 202 are used to provide specific frequency/time slot channels (TDMA/FDMA) or frequency/code (CDMA/FDMA) channels. Up conversion mixer 206 is coupled to D/A converter 204 and power amplifiers 208. D/A converter 204 converts the digital signal received from either TDMA or CDMA channelizers/modulators 200, 202, to an analog signal. Up conversion mixer 206 converts an IF (intermediate frequency) signal to an RF analog signal using either a TDMA local oscillator (LO) signal or a CDMA local oscillator signal (LO), e.g., RF=LO+IF. After the RF signal is amplified by power amplifiers 208, it is transmitted by an antenna (could be multiple antennas if the TDMA and CDMA spectrum is separated by an amount larger than the bandwidth of a single antenna) to a satellite.

Figure 5:
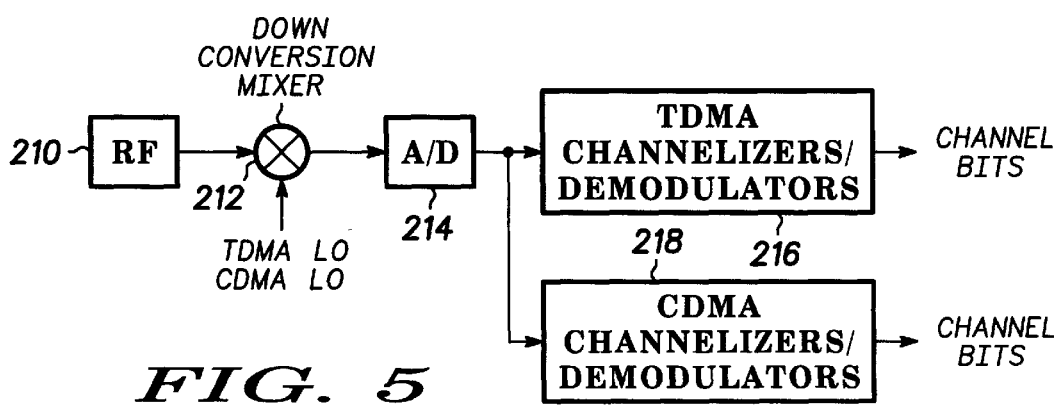
FIG. 5 shows a block diagram of a receiver system of a subscriber unit according to a preferred embodiment of the present invention.

FIG. 5 shows a block diagram of a receiver system of a subscriber unit according to a preferred embodiment of the invention. The receiver system of subscriber unit 30 comprises RF front end 210, down conversion mixer 212, A/D converter 214, TDMA channelizer/demodulator 216 and CDMA channelizer/demodulator 218. The parts used in the receiver system of subscriber unit 30 are well known to those skilled in the art and are commercially available. The operation and functions of the parts in receiver system of subscriber unit 30 are similar to the parts shown and described in FIG. 3.

As shown in FIG. 5, RF front end 210 is coupled to down conversion mixer 212 and is able to receive RF signals. RF front end 210 comprises an external receive antenna and a low noise amplifier (LNA). In an alternative embodiment and specifically for digital beamforming, RF front end 210 comprises an LNA, mixer and A/D converter in an integrated package.

The received RF signal is sent to down conversion mixer 212. Down conversion mixer 212 takes the RF signal and converts it to an IF signal using a signal from TDMA or CDMA LO signal, e.g., IF=RF–LO. The IF signal is then converted into a digital signal by A/D converter 214 and fed into TDMA channelizers/demodulators 216 or CDMA channelizers/demodulators 218. Channelizers/demodulators 216, 218 channelizes the digital IF signal into the desired narrow frequency channel and demodulates it to produce channel bits which are output by channelizers/demodulators 216 or 218.

Figure 6:
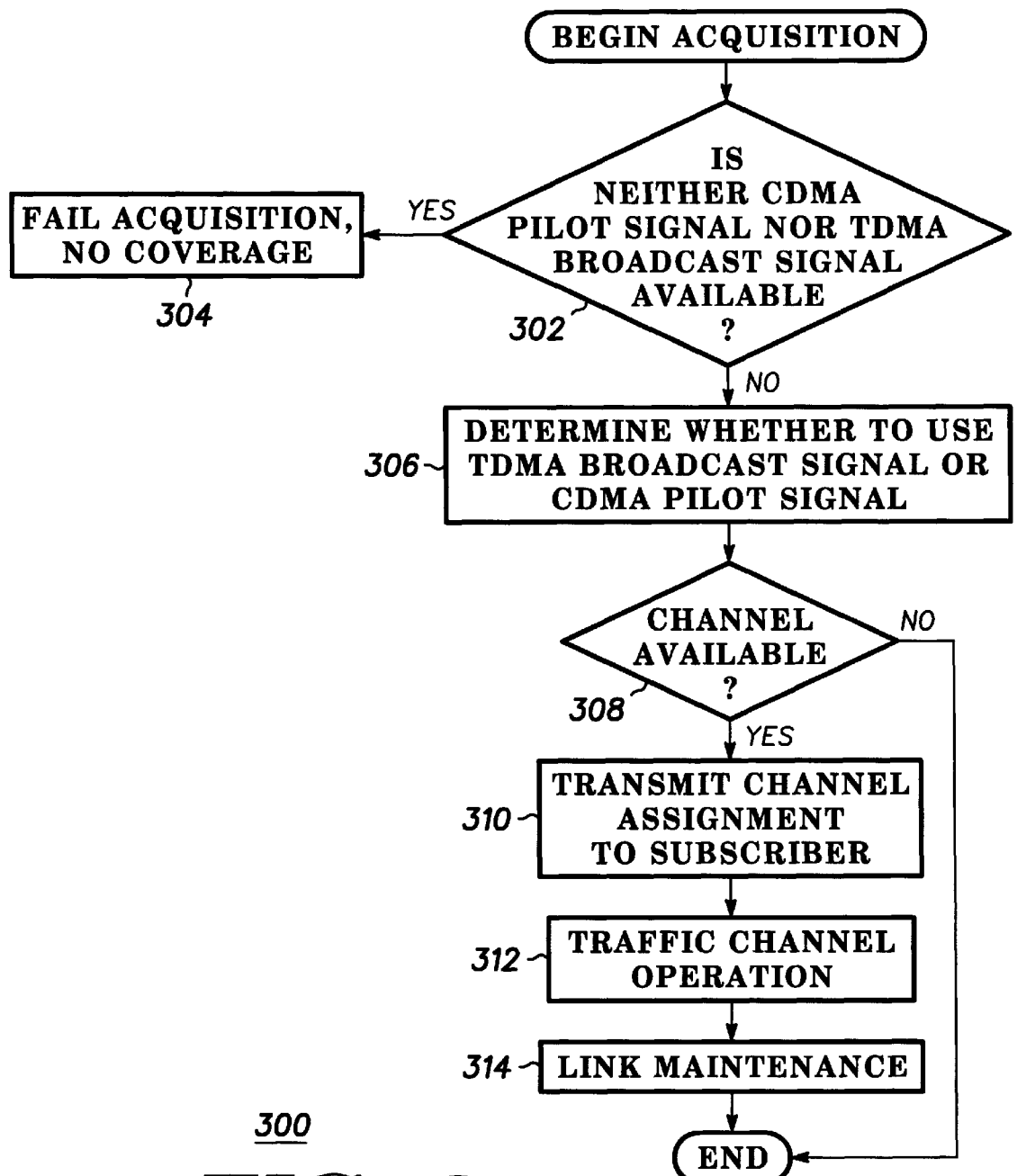
FIG. 6 shows a flowchart of a channel acquisition and management method according to a preferred embodiment of the present invention.

FIG. 6 shows a flowchart of a channel acquisition and management method according to a preferred embodiment of the present invention. Method 300 includes the acquisition process which finds either a CDMA pilot channel or a TDMA broadcast channel and determines whether to use a CDMA or TDMA traffic channel for communication between the subscriber unit and a satellite or a base station. Method 300 also includes the traffic channel management decision and traffic channel link maintenance functions. Some of the steps of method 300 are executed by a satellite and/or a base station, and some are executed by a subscriber unit. For purposes of discussion, a satellite will be referred to, although a base station can perform the same functions or steps as performed by the satellite.

Method 300 begins in step 302 when a subscriber unit wants to acquire a traffic channel for making a phone call to a destination. The subscriber unit searches for a CDMA pilot signal or TDMA broadcast signal. In step 302 of FIG. 6, the subscriber unit determines whether a CDMA pilot signal or a TDMA broadcast signal is available. If neither a CDMA pilot signal or a TDMA broadcast signal is available, the acquisition fails in step 304 and method 300 ends. Otherwise, since the subscriber unit is capable of receiving and demodulating either a CDMA pilot signal or a TDMA broadcast signal, it will search for the existence of one or both of these channels by modifying the LO signal to down-convert to the appropriate IF frequency, and then routing that signal to the CDMA or TDMA channelizer/demodulator. After the demodulation (assuming successful reception), the subscriber unit can examine the data bits to determine the acquisition channel information in either the CDMA or TDMA system. Having this information, the subscriber now can access in step 306 either the CDMA or TDMA system of its choice based on signal strength, preference, or availability.

Once the subscriber unit acquires in step 306 either a CDMA pilot channel or a TDMA broadcast channel, a channel request is made to the satellite. The satellite then determines in step 308 if there is an available traffic channel according to the channel management process shown in FIG. 7 which is described in more detail below. After the satellite finds an available traffic channel, the channel assignment is transmitted in step 310 to the subscriber unit, and the subscriber unit commences communication over the traffic channel in step 312. While the subscriber unit is using the traffic channel, link maintenance is performed in step 314 by the satellite, base station and/or subscriber unit. Link maintenance allows for modifications in power level as the user environment changes and optimization of frequency/code assignments over changing loads.

If there is no available channel in step 308, and after step 314, method 300 ends. It is important to understand that a subscriber unit can acquire a CDMA pilot channel, but the satellite/base station can determine that the subscriber unit should be using a TDMA traffic channel instead. If this is the case, the subscriber unit will switch over to a TDMA traffic channel at the request of the satellite. The inverse is true as well where the subscriber unit acquires a TDMA broadcast channel but can be assigned a CDMA traffic channel by the satellite.

Figure 7:
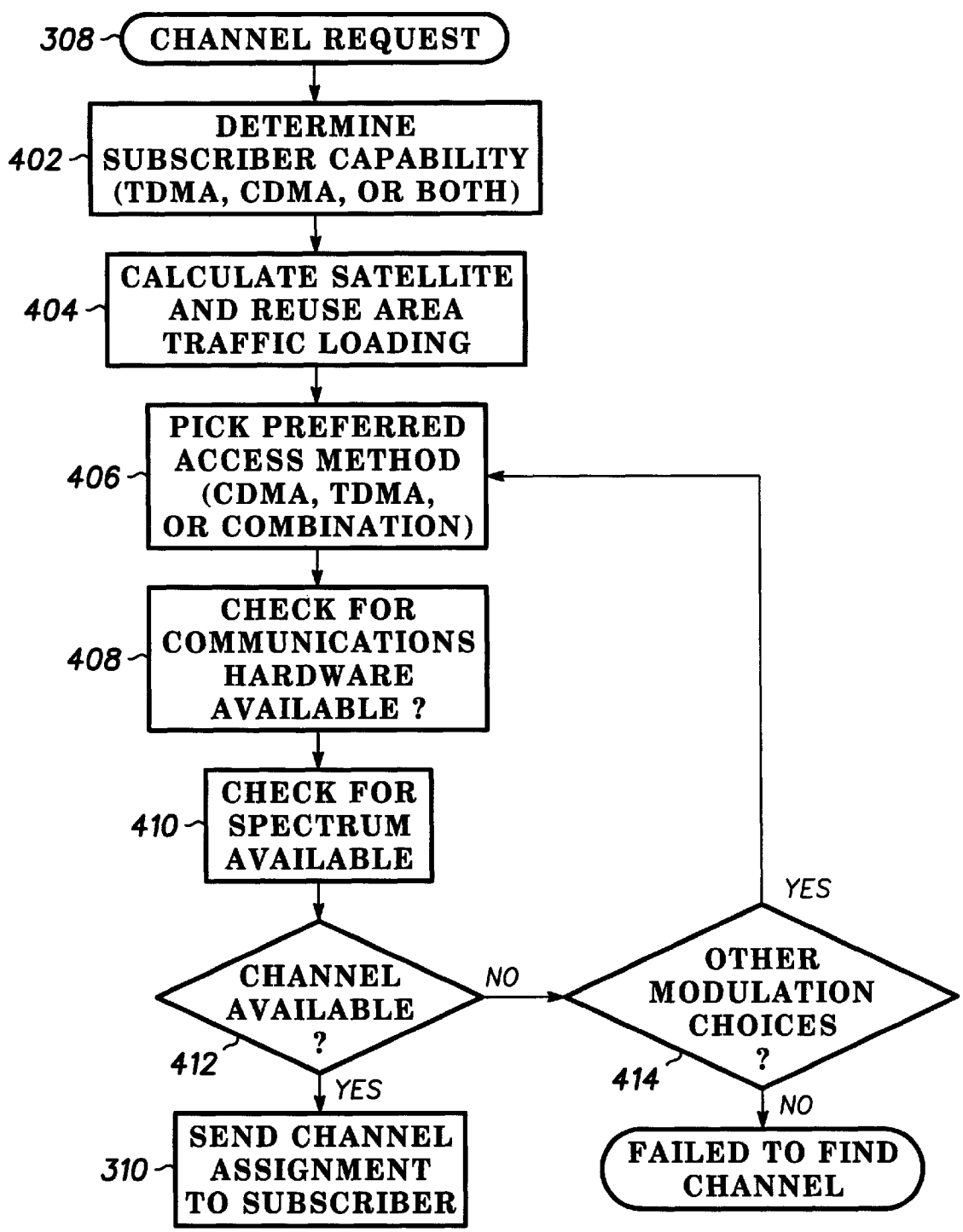
FIG. 7 shows a flowchart of a channel management method according to a preferred embodiment of the invention.

FIG. 7 shows a flowchart of a channel management method 308 according to a preferred embodiment of the invention. Whenever a step can be performed by a satellite, it can also be performed by a base station, although reference will only be made to a satellite. The method begins in step 307 (FIG. 6) when the subscriber unit transmits a channel request to a satellite. The satellite determines in step 402 whether the subscriber unit making the request is able to operate using TDMA, CDMA or both. The subscriber unit's capability is communicated via the channel request in a number of various ways well known to those skilled in the art. Some subscriber units can communicate using TDMA or CDMA, while other subscriber units can only communicate using one access scheme but not both.

Once the satellite determines the subscriber unit's capability in step 402, the satellite calculates in step 404 the traffic loading on the satellite and a reuse area. The impact of the interference generated from surrounding beams within the reuse area needs to be evaluated. There are a variety of ways to calculate the load on the satellite and reuse area traffic loading that are well known to those of ordinary skill in the art. After the satellite determines in step 404 the satellite and reuse area traffic loading, the satellite picks a preferred access method (e.g., CDMA, TDMA or a combination) for the uplink and/or downlink based on the loading analysis.

Table 1 below represents one example of the available options based on the neighbor cell loading and the current cell loading when both the TDMA and CDMA schemes are utilizing the same spectrum.

TABLE 1

| NEIGHBOR CELL LOADING | CURRENT CELL LOADING | | |
| --- | --- | --- | --- |
| | LOW LOAD | MEDIUM LOAD | HIGH LOAD |
| LOW LOAD | TDMA OR CDMA | TDMA OR CDMA | TDMA ONLY |
| MEDIUM LOAD | TDMA OR CDMA | CDMA ONLY | TDMA ONLY |
| HIGH LOAD | TDMA ONLY | CDMA ONLY | CDMA ONLY |

For example, if the load on the neighbor cells is low, but the current cell is experiencing a high load, according to Table 1, the satellite would choose TDMA for the subscriber unit's access scheme. If the load on the neighbor cells and the current cell are low, the satellite would have a choice between using TDMA or CDMA. Table 1 only represents an example of what a satellite can choose based on loading conditions of the neighbor cells and the current cell. Other tables for selecting whether the subscriber unit communicates via TDMA or CDMA could be devised based on similar criteria used in Table 1 or on other factors well known to those of ordinary skill in the art.

The satellite can also select that the uplink and downlink have the same modulation scheme, or that a different access technique be used for the uplink versus the downlink. Table 2 lists the four different access possibilities for the uplink and the downlink.

TABLE 2

| | UPLINK | DOWNLINK |
| --- | --- | --- |
| 1 | CDMA | CDMA |
| 2 | TDMA | TDMA |
| 3 | CDMA | TDMA |
| 4 | TDMA | CDMA |

Once the satellite selects which method of access to use for the uplink and downlink in step 406, the satellite checks in step 408 to see if the communications hardware is available and whether there is spectrum available in step 410. If the satellite determines that the channel (or channels) are available for the subscriber unit in step 412, the satellite sends in step 310 (FIG. 6) the channel assignment to the subscriber unit. Otherwise, the satellite determines in step 414 if there are any other access choices available. If there are other access choices left, the satellite returns to step 406 shown in FIG. 7 to choose the next best access method. The satellite repeats steps 406, 408, 410, 412 and 414 until a channel is found, or until there are no access choices left. If there are no other access choices in step 414, this indicates that the satellite was unable to find an available channel, and the methods of FIGS. 6 and 7 end until the next channel acquisition cycle.

There are many advantages to the present invention. One advantage of the invention is to combine TDMA and CDMA in a satellite communication system. Another advantage of the invention is that subscriber units are segmented into using one access scheme over another based on peak or loading capacity needs. Another advantage of the invention is that the subscriber unit can use a different access scheme on the uplink than what is used on the downlink.

Accordingly, it is intended by the appended claims to cover all modifications of the invention which fall within the true spirit and scope of the invention.

What is claimed is:

1. A method for use in a dual mode satellite communications network, comprising the steps of:

a) finding either a code division multiple access (CDMA) pilot channel or a time division multiple access (TDMA) broadcast channel; and b) determining whether to use a CDMA traffic channel or a TDMA traffic channel between a subscriber unit and a satellite, wherein step (b) further comprises the steps of:

determining whether the subscriber unit can operate in TDMA, CDMA or both;

calculating a traffic load on the satellite and a reuse area; and selecting whether to use CDMA or TDMA or a combination for an uplink and a downlink based on the traffic load on the satellite and the reuse area.

2. A method as recited in claim 1, further comprising the steps of:

determining if spectrum is available in the selected CDMA or TDMA traffic channel; and sending the selected CDMA or TDMA traffic channel to the subscriber unit if the spectrum is available.

* * * * *